United States Patent Office 2,841,628
Patented July 1, 1958

2,841,628

USE OF CERTAIN BIS(2,4-DIALKYLPHENOL) MONOSULFIDES IN RUBBER AS ANTIOZONANT AND PRODUCT OBTAINED

Harry E. Albert, Akron, Ohio, assignor to The Firestone Tire & Rubber Company, Akron, Ohio, a corporation of Ohio No Drawing. Application December 24, 1953
Serial No. 400,341

12 Claims. (Cl. 260—810)

This invention relates to the use of certain bis(2,4-dialkylphenol) monosulfides as antiozone agents in shaped natural rubber products which are white or light colored.

The particular bis(2,4-dialkylphenol) monosulfides which are covered herein are those in which the 2-alkyl radical contains three to twelve carbon atoms and in which the 4-alkyl radical is methyl. Similar compounds in which the 2-alkyl group contains only one or two carbon atoms discolor white and light colored stocks. The presence of an alkyl group of more than one or two carbon atoms in the 4-position dilutes the antiozone activity of the compound so that it does not afford the protection offered by those compounds in which the 4-alkyl group is methyl.

Oxygen and ozone both have a harmful effect on rubber, but the effect of each is different, and compounds which inhibit or prevent the harmful effect of one are not necessarily effective in stopping the harmful effect of the other.

Crabtree and Kemp in an article in Industrial and Engineering Chemistry, vol. 38, starting at page 278 (1946), explain the difference in the action of oxygen and ozone. The light-catalyzed oxidation which occurs during outdoor exposure forms a skin and crazed appearance over the exposed surface of the rubber. Ozone, even in very low concentration, attacks stretched rubber only, (C. H. Leigh-Dugmore, Rubber Age and Synthetics, November and December 1952) and forms cracks perpendicular to the direction of stretch, and such cracking can occur in the absence of light.

As a matter of fact, practically all commercial rubber antioxidants are without effect in inhibiting the deterioration caused by ozone. The inhibitors of this invention do not absorb or act directly on the ozone, but have some unknown action in preventing the cracking which is associated with ozone exposure in stretched natural rubber.

Natural rubber is used in the manufacture of the white sidewalls of tires. The cracking of such sidewalls has long been a problem. It is often very extensive, and because of the color of the sidewall it is very noticeable. It is a primary object of this invention to provide antiozone agents which prevent such cracking without discoloring the sidewall. However, the antiozone agents of this invention are not limited to that use but can be employed in other white rubber stocks and in rubber stocks which are not white but are light colored.

Tires are stressed when inflated. While a tire is at rest it is stretched statically, and on a moving vehicle it is stretched dynamically. Some of the antiozone agents are more effective in static tests and others are more effective in dynamic tests. Antiozone agents effective under both conditions will be desired for tires, but for other rubber products an antiozone agent which does not meet both tests can be used to an advantage.

The antiozone agents of this invention include, for example, the following:

Bis(2-t-butyl-4-methylphenol) monosulfide
Bis(2-tt-octyl-4-methylphenol) monosulfide
Bis(2-sec-butyl-4-methylphenol) monosulfide
Bis(2-isopropyl-4-methylphenol) monosulfide
Bis(2-t-amyl-4-methylphenol) monosulfide
Bis(2-nonyl-4-methylphenol) monosulfide
Bis(2-t-hexyl-4-methylphenol) monosulfide The inhibiting effect of the antiozone agents in rubber was determined by treatment of unaged, cured stocks with air of controlled low ozone content in specially designed equipment and also by outdoor exposure to natural weathering. The tests were conducted with one-half inch dumbbell samples of approximately 100 gauge thickness. The special apparatus for testing with air of controlled low ozone content and the method of testing therein are described in the articles by Ford and Cooper, appearing in India Rubber World for September and October 1951, entitled "A study of the factors affecting the weathering of rubber-like materials." The following reports of such tests give the ozone concentration maintained during each test in parts per 100,000,000 parts of air, the duration of the test, and the temperature used. Two types of tests were conducted. In one type, called the dynamic test, the sample was repeatedly stretched between the limits of 0 and 20 percent elongation at the rate of 108 cycles per minute. In the other type of test, the static test, the samples were stretched at 12.5 percent elongation throughout the test. No special lights were used in either test. On completion of each test the size of the cracks in each sample was compared visually with the size of the cracks in a blank which contained no antiozone agent and which was cured and tested at the same time as the test sample. The size was determined according to an arbitrary scale of measuring, using the numerals 0, 1, 2, 3, 4 and 5 to represent no visual cracking and cracks which were very fine, fine, medium, coarse and very coarse, respectively.

The reported results include data on the tensile properties of the cured rubber stocks before and after aging 2 days in an oven at 212° F. The modulus and tensile strength are given in pounds per square inch and the elongation is reported as percent of stretch at the break. These data are included to show that the antiozone agents have no substantial deleterious effect on the cure or upon the aging of the cured stocks.

The antiozone agents were tested in white stock such as might be used in white sidewalls for tires. The blanks of the white stock were compounded according to the following formula:

| | Parts by weight |
|---|---|
| Natural rubber | 100 |
| White pigment and filler | 90.2 |
| Stearic acid | 1.2 |
| Sulfur | 3.0 |
| Accelerator | 0.9 |

All blanks and test samples were cured 60 minutes at 280° F.

In all of the test samples, both those tested in the special apparatus and those subjected to natural outdoor weathering, 2.0 parts by weight of the antiozone agent was added to the blank formula for each 100 parts by weight of the rubber present. Any substantial small amount can be employed, and this can vary, for example, from 0.2 part by weight to 10 parts by weight, depending upon the use to be made of the rubber composition.

The first five of the following tables give test data comparing the physical properties of test samples and blanks, as well as comparing the size of cracks developed in both the static and dynamic ozone tests.

Table 1

| | | | | |
|---|---|---|---|---|
| Blank | 195.3 | 195.3 | 195.3 | 195.3 |
| Bis (2-tt-octyl-4-methylphenol) monosulfide | | 2 | | |
| Bis (2-t-butyl-4-methylphenol) monosulfide | | | 2 | |
| Bis (2-sec-butyl-4-methylphenol) monosulfide | | | | 2 |
| Cured 60 minutes at 280° F. | | | | |
| Normal Tensile Properties: | | | | |
|     400% Modulus | 900 | 800 | 750 | 750 |
|     Tensile Strength | 3,525 | 3,400 | 3,525 | 3,450 |
|     Elongation | 680 | 645 | 660 | 640 |
| Aged 2 Days in Oven at 212° F.: | | | | |
|     400% Modulus | 750 | 875 | 825 | 775 |
|     Tensile Strength | 1,325 | 1,925 | 1,600 | 1,300 |
|     Elongation | 470 | 520 | 505 | 465 |
| Ozone Effects (7 Hrs. at 60 p. p. h. m. and 95° F.): | | | | |
|     Static | 4 | 0+ | 0+ | 0+ |
|     Dynamic | 4− | 0+ | 0+ | 0+ |

Table 2

| | | |
|---|---|---|
| Blank | 195.3 | 195.3 |
| Bis (2-tt-octyl-4-methylphenol) monosulfide | 0 | 2 |
| Normal Properties: | | |
|     400% Modulus | 925 | 800 |
|     Tensile Strength | 3,800 | 3,625 |
|     Elongation at Break | 640 | 640 |
| Properties after Aging 2 Days in Oven at 212° F.: | | |
|     400% Modulus | 900 | 1,000 |
|     Tensile Strength | 1,975 | 2,375 |
|     Elongation at Break | 525 | 535 |
| Ozone Effect (7 Hrs. at 60 p. p. h. m. and 95° F.): | | |
|     Static | 4 | 0 |
|     Dynamic | 4 | 0+ |

Table 3

| | | |
|---|---|---|
| Blank | 195.3 | 195.3 |
| Bis (2-tt-octyl-4-methylphenol) monosulfide | 0 | 2 |
| Normal Properties: | | |
|     400% Modulus | 875 | 800 |
|     Tensile Strength | 3,625 | 3,450 |
|     Elongation at Break | 635 | 625 |
| Properties After Aging 2 Days in Oven at 212° F.: | | |
|     400% Modulus | 725 | 975 |
|     Tensile Strength | 1,875 | 2,150 |
|     Elongation at Break | 540 | 535 |
| Ozone Effect (7 Hrs. at 60 p. p. h. m. and 95° F.): | | |
|     Static | 4− | 0 |
|     Dynamic | 3 | 0+ |

Table 4

| | | |
|---|---|---|
| Blank | 195.3 | 195.3 |
| Bis (2-tt-octyl-4-methylphenol) monosulfide | 0 | 2 |
| Normal Properties: | | |
|     400% Modulus | 1,025 | 900 |
|     Tensile Strength | 3,550 | 3,575 |
|     Elongation at Break | 620 | 640 |
| After Aging 2 Days in Oven at 212° F.: | | |
|     400% Modulus | 725 | 975 |
|     Tensile Strength | 1,700 | 2,275 |
|     Elongation at Break | 525 | 535 |
| Ozone Effects (7 Hrs. at 60 p. p. h. m. and 95° F.): | | |
|     Static | 4 | 0 |
|     Dynamic | 3+ | 0+ |

The following tables record the results obtained by weathering various cured samples of stocks compounded according to the foregoing formula for different lengths of time. The products were tested in groups and each group was tested against a different blank. Therefore, in evaluating the results, each sample is to be compared with the blank next above it. The results are spaced to facilitate such comparison. In the headings, F, B, and E stand for the front, back and edge of the samples, respectively. The crack size is reported in each instance.

Table 5.—Natural weathering

| | After 30 Days | | |
|---|---|---|---|
| | F | B | E |
| Blank | 4+ | 1+ | 4+ |
| Bis (tt-octyl-4-methylphenol) monosulfide | 2− | 0+ | 1 |
| Blank | 4+ | 5 | 4 |
| Bis (2-t-butyl-4-methylphenol) monosulfide | 2− | 2− | 2− |
| Bis (2-sec-butyl-4-methylphenol) monosulfide | 2+ | 2− | 2+ |

Table 6.—Natural weathering

| | After 10 Days | After 20 Days | After 30 Days |
|---|---|---|---|
| Blank | 2+ | 4 | 4 |
| Bis (2-t-octyl-4-methylphenol) monosulfide | 0 | 0 | 1 |

Table 7.—Natural weathering

| | After 30 Days | | After 90 Days | | |
|---|---|---|---|---|---|
| | F | B | F | B | E |
| Blank | 2− | 2 | 2− | 2− | 2 |
| Bis (2-t-amyl-4-methylphenol) monosulfide | 1− | 1− | 1 | 1+ | 1+ |
| Blank | 2+ | 2− | 2+ | 2 | 3+ |
| Bis (2-isopropyl-4-methylphenol) monosulfide | 1− | 1− | 1 | 1 | 1+ |
| Blank | 2+ | 2 | 2 | 1+ | 2+ |
| Bis (2-tt-octyl-4-methylphenol) monosulfide | 1− | 1− | 1+ | 1+ | 1 |
| Blank | 2 | 1+ | 2 | 1 | 2 |
| Bis (2-dodecyl-4-methylphenol) monosulfide | 1− | 1− | 1 | 1 | 1+ |
| Bis (2-nonyl-4-methylphenol) monosulfide | 1− | 1− | 1 | 1 | 1+ |

Table 8.—Outdoor exposure

| | After 20 Days | | | After 28 Days | | |
|---|---|---|---|---|---|---|
| | F | B | E | F | B | E |
| Blank | 4 | 1 | 4 | 4− | 1+ | 4 |
| Bis (2-tt-octyl-4-methylphenol) monosulfide | 1 | 1 | 2 | 1 | 1 | 2− |

The next test refers to an actual field test of white sidewall tires driven 20,000 miles. A white sidewall of natural rubber containing 2 parts of bis(2-tt-octyl-4-methylphenol) monosulfide was tested against a white sidewall of identical composition, except that it contained no antiozone agent. The tires were examined every 4000 miles for weather checking, with the following results:

Table 9.—Weather checking

| Miles Run | Control Tire | Test Tire |
|---|---|---|
| 4,000 | Slight | None. |
| 8,000 | Slight to Moderate | Do. |
| 12,000 | do | Do. |
| 16,000 | Moderate | Do. |
| 20,000 | Bad | Very Slight. |

These tires were also examined for discoloration of the rubber and for radial cracking, and the control tire and test tire were rated the same on both counts, and therefore the antiozone agent did not discolor and it neither accelerated nor retarded radial cracking.

In other discoloration tests, using a General Electric S-1 sunlamp, with the samples 7 inches from the lamp, rubber stocks compounded according to the foregoing formula were tested, employing two percent of different antiozone agents. The tests were not run at the same time and the results recorded below are therefore not compared with a blank tested simultaneously.

Table 10.—Discoloration tests

| | 48 Hours Under Sunlamp | |
|---|---|---|
| | Unexposed | Exposed |
| Blank | Off White | White. |
| Bis (2-t-butyl-4-methylphenol) monosulfide | do | Do. |
| Bis (2-tt-octyl-4-methylphenol) monosulfide | do | Do. |

The recorded results are illustrative. The antiozone agents can be used in rubber compositions compounded for use in tires and for latex compositions compounded for use in rubber thread, and in other rubber stocks.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially the relatively active accelerators including the thiazole sulfenamides, e. g. N-cyclohexyl-2-benzothiazolesulfenamide, thiazoline sulfenamides, thiocarbamyl sulfenamides, mercaptothiazoles, mercaptothiazolines, thiazolyl mono- and di-sulfides, the N, N-dialkyl-dithiocarbamates, the thiuram sulfides, the xanthogen sulfides, metallic salts of mercaptothiazoles or mercaptothiazolines or dithiocarbamic acids. One or more accelerator activator is often used with any of the accelerators mentioned, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra accelerator by allowing the film to remain at room temperature for several hours or a few days.

What I claim is:

1. A light-colored sulfur-vulcanized shaped natural-rubber product which contains a small amount of a bis-(2-alkyl-4-methylphenol) monosulfide sufficient to inhibit ozone deterioration, in which the 2-alkyl group contains three to twelve carbon atoms.

2. A light-colored sulfur-vulcanized shaped natural-rubber product which contains a small amount of bis-(2-isopropyl-4-methylphenol) monosulfide sufficient to inhibit ozone deterioration.

3. A light-colored sulfur-vulcanized shaped natural-rubber product which contains a small amount of bis-(2-tt-octyl-4-methylphenol) monosulfide sufficient to inhibit ozone deterioration.

4. A light-colored sulfur-vulcanized shaped natural-rubber product which contains a small amount of bis-(2-t-amyl-4-methylphenol) monosulfide sufficient to inhibit ozone deterioration.

5. A light-colored sulfur-vulcanized shaped natural-rubber product which contains a small amount of bis-(2-t-butyl-4-methylphenol) monosulfide sufficient to inhibit ozone deterioration.

6. A light-colored sulfur vulcanized shaped natural-rubber product which contains a small amount of bis-(2-sec-butyl-4-methylphenol) monosulfide sufficient to inhibit ozone deterioration.

7. The process of sulfur-vulcanizing a natural rubber composition which comprises vulcanizing such composition in the presence of a small amount of a bis(2-alkyl-4-methylphenol) monosulfide sufficient to inhibit ozone deterioration, in which the 2-alkyl group contains three to twelve carbon atoms.

8. The process of sulfur-vulcanizing a natural rubber composition which comprises vulcanizing it in the presence of a small amount of bis(2-isopropyl-4-methylphenol) monosulfide sufficient to inhibit ozone deterioration.

9. The process of sulfur-vulcanizing a natural rubber composition which comprises vulcanizing it in the presence of a small amount of bis(2-t-amyl-4-methylphenol) monosulfide sufficient to inhibit ozone deterioration.

10. The process of sulfur-vulcanizing a natural rubber composition which comprises vulcanizing it in the presence of a small amount of bis(2-tt-octyl-4-methylphenol) monosulfide sufficient to inhibit ozone deterioration.

11. The process of sulfur-vulcanizing a natural rubber composition which comprises vulcanizing it in the presence of a small amount of bis(2-t-butyl-4-methylphenol) monosulfide sufficient to inhibit ozone deterioration.

12. The process of sulfur-vulcanizing a natural rubber composition which comprises vulcanizing it in the presence of a small amount of bis(2-sec-butyl-4-methylphenol) monosulfide sufficient to inhibit ozone deterioration.

References Cited in the file of this patent

UNITED STATES PATENTS

| | | |
|---|---|---|
| 2,175,082 | Hagen et al. | Oct. 3, 1939 |
| 2,270,183 | Cook et al. | Jan. 13, 1942 |
| 2,370,756 | Sibley | Mar. 6, 1945 |
| 2,670,383 | Beaver et al. | Feb. 23, 1954 |
| 2,700,691 | Mayes | Jan. 25, 1955 |
| 2,726,277 | Downey | Dec. 6, 1955 |

OTHER REFERENCES

Cook et al.: Ind. and Eng. Chem., volume 40, No. 7, July 1948, pages 1194–1202.